United States Patent [19]

Wang et al.

[11] Patent Number: 4,964,097

[45] Date of Patent: Oct. 16, 1990

[54] THREE DIMENSIONAL IMAGE CONSTRUCTION USING A GRID OF TWO DIMENSIONAL DEPTH SECTIONS

[75] Inventors: Shein S. Wang; Douglas W. Hanson; Thomas D. Cavanaugh, all of Ponca City, Okla.

[73] Assignee: Conoco Inc., Ponca City, Okla.

[21] Appl. No.: 459,911

[22] Filed: Jan. 2, 1990

[51] Int. Cl.$^5$ .............................................. G01V 1/36
[52] U.S. Cl. ...................................... 367/73; 364/421
[58] Field of Search .................... 364/421; 367/59, 73, 367/74, 50, 53

[56] References Cited

U.S. PATENT DOCUMENTS

| | | | |
|---|---|---|---|
| 4,241,429 | 12/1980 | Bloomquist et al. | 367/52 |
| 4,672,545 | 6/1987 | Lin et al. | 364/421 |
| 4,736,347 | 4/1988 | Goldberg et al. | 367/46 |
| 4,766,574 | 8/1988 | Whitmore, Jr. et al. | 367/50 |

Primary Examiner—Ian J. Lobo

[57] ABSTRACT

A method for generating a three dimensional velocity model makes use of two dimensional depth images, which are the result of two dimensional pre-stack depth migration, and corrects the out of plane distortion by ray tracing through a three dimensional model. The three dimensional model boundaries are iterated until the three dimensional effects are minimized. The final model can be used for a final three dimensional pre-stack depth migration, or as a three dimensional interpretation of all the two dimensional depth migration results.

8 Claims, 1 Drawing Sheet

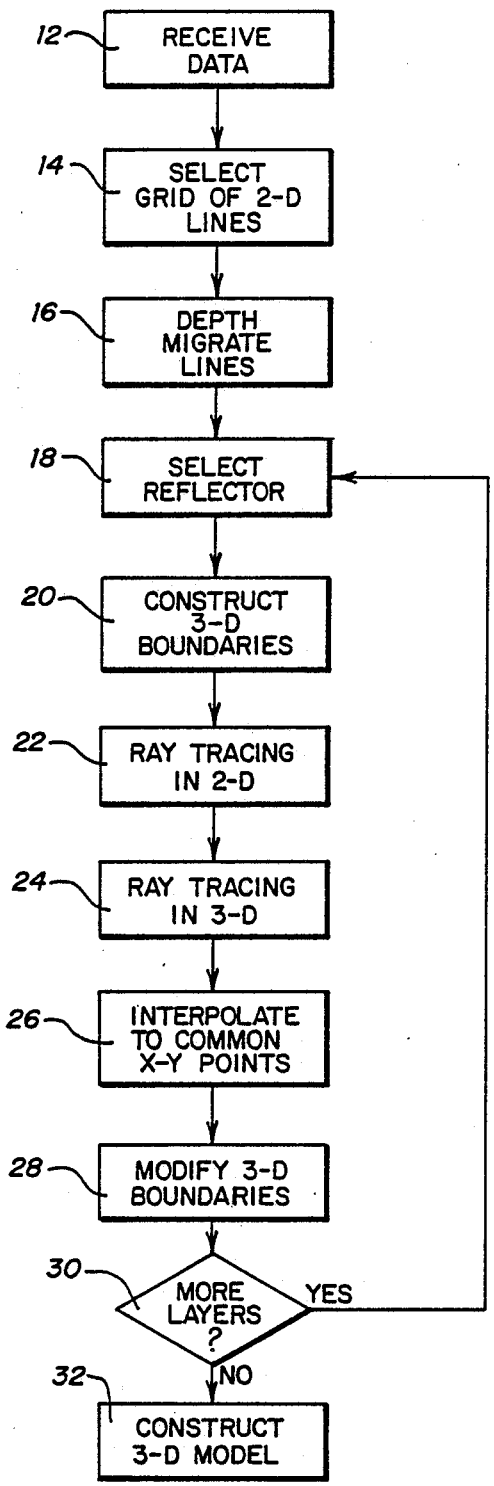

THREE DIMENSIONAL IMAGE CONSTRUCTION USING A GRID OF TWO DIMENSIONAL DEPTH SECTIONS

BACKGROUND OF THE INVENTION

1. Field of the Invention

The present invention relates to velocity models and three dimensional image construction and more particularly to the construction of three dimensional images using a grid of two dimensional depth sections.

2. Related Prior Art

The acquisition of a seismic line that is a true dip line is the exception rather than the rule. The result is that most reflectors originate out of the vertical reflection plane, and the problem of out of the plane events increases in severity with depth and structural complexity. A three dimensional prestack depth migration is needed to properly image all the reflectors. It is an expensive process to generate a three dimensional velocity model through repetitive three dimensional seismic migrations. Also, picking from stacked sections is extremely difficult in complex areas because the primary reflections are badly distorted. In contrast, two dimensional pre-stack depth migration produces a stronger image in these situations and is becoming cheaper to produce. Pre-stack two dimensional depth migration does the optimum job of migrating data that has dip along the line, but it does not image the cross-dipping events correctly.

There are many methods for producing three dimensional models from two dimensional data. Examples of methods which may be employed in working with three dimensional data are contained in U.S. Pat. Nos. 4,736,347 and 4,241,429.

U.S. Pat. No. 4,736,347 titled *"Multiple Stacking and Spatial Mapping of Seismic Data"* (Bernard Goldberg et al.) relates to a method for determining the dip of subsurface formations and the apparent acoustic velocity Seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates This process may be applied to obtain earth models and seismic sections in both two and three dimensions.

U.S. Pat. No. 4,241,429 titled *"Velocity Determination and Stacking Process from Seismic Exploration of Three Dimensional Reflection Geometry"* (Marvin G. Bloomquist et al.) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal moveout velocity search of the type performed on two dimensional common depth point (CDP) sets. This search identifies the correct stacking velocity and hyperbola offset which are used to determine dip, strike and average velocity.

SUMMARY OF THE INVENTION

The present invention relates to a method which generates a three dimensional velocity model by making use of two dimensional depth images, which are the result of two dimensional pre-stack depth migration. The present invention corrects out of plane distortion by ray tracing through a three dimensional model. The three dimensional model boundaries are iterated until the three dimensional effects are minimized. The final model can be used for a final three dimensional pre-stack depth migration, or as a three dimensional interpretation of the two dimensional depth migration results Since the quality of two dimensional depth images is high and the cost of three dimensional ray tracing is low, this process will provide a high quality three dimensional model at low cost.

BRIEF DESCRIPTION OF THE DRAWINGS

The included figure is a flow chart of the method of the present invention.

DESCRIPTION OF THE PREFERRED EMBODIMENT

The present invention provides a method for generating a three dimensional velocity model by making use of the excellent two dimensional depth images, which is the result of two dimensional pre-stack depth migration, and correct the out of plane distortion by ray-tracing through a three dimensional model. The three dimensional model boundaries are iterated until the three dimensional effects are minimized. The final model can be use for a final three dimensional pre-stack depth migration, or as a three dimensional interpretation of all the two dimensional depth migration results. Since the quality of two dimensional depth images is high and the cost of three dimensional ray-tracing is low this process will provide a high-quality three dimensional model at low cost.

Referring now to the attached figure, the method of the present invention is illustrated. At block 12 three dimensional data is received. This data may take the form of time migrated time sections for a plurality of seismic lines.

At block 14 a grid of two dimensional seismic lines are selected, and the time migrated time section for each line is interpreted and the horizons color coded. A velocity/depth model may be constructed for each line using any method commonly used in the art. The model boundaries correspond to the sequence of interpreted reflectors on the time migrated data.

At block 16 the selected seismic lines are depth migrated. All of the lines are depth migrated using the model, and the residual processing may be done by any method known in the art. One such method is explained co-pending patent application Ser. No., 07/444509, "Common Offset Depth Migration with Residual Moveout Correction." The result is a set of well imaged depth sections with clear, well-defined reflectors, The time interpretation for each two dimensional line is then transferred to the corresponding two-dimensional depth section.

Events caused by severe sideswipe are usually easy to identify. However, the problem is that most events reflect from out of the section plane to some extent. The following steps attempt to identify the true reflection point in threedimensional space and move the interpreted point over to that location.

Next, an initial three dimensional velocity/depth model is created. This is done by creating an initial three dimensional velocity/depth model that is in agreement with the images on all of the two dimensional lines. The two dimensional boundaries are then moved to their corresponding reflecting points within this three dimensional model. This is a layer by layer process, starting with the first layer and going down through the model.

The boundaries of the three dimensional model are developed layer by layer. At block 18 a first interpreted reflector is selected from the available grid of two dimensional depth sections At block 20 the corresponding boundary in the three dimensional model is constructed by interpolating the grid of corresponding depth points Smoothing may be required if the mis-ties in depth are large. This is initial guess for the three dimensional reflector.

At block 22 ray tracing is done in two dimensions. For each line, normal rays are shot from the picked reflector up to the surface using the corresponding two dimensional model. Normal rays are normal to the reflector. Travel times along the normal rays are calculated using the appropriate two dimensional depths and velocities, and saved. The travel times from the selected reflector to the surface for all of the two dimensional lines computed from the respective two dimensional models are obtained.

These travel times correspond to recorded time events from the stacked seismic data. The advantages of calculating the values rather than picking them off of the stacked sections is that stacked sections are very difficult to interpret in structurally complex areas. The computed traveltimes correspond to boundaries in the three dimensional world, and the actual reflecting may have occurred out of the two dimensional plane. This will be verified by doing the comparable image ray generation through the three dimensional model. If the two sets of travel times agree, then all three-dimensional effects have been modeled correctly, an the three dimensional model down to the selected boundary is acceptable. If they disagree, the three dimensional model has to be modified.

At block 24 ray tracing is done in three dimensions. Normal rays from the selected three dimensional boundary up to the surface can be generated and travel times can be calculated. The end points of the three dimensional normal rays will be different from those generated along the two dimensional lines. Three dimensional normal rays will be different from those generated along the two dimensional lines.

To make the data comparable, both data sets are interpolated to common x-y points at block 26.

At block 28 the three dimensional model boundary is modified by moving it up or down along the normal ray direction proportionate to the amount of mismatch. This would provide an improved estimate for the boundary position. This step is repeated until the differences between the two dimensional and three dimensional time values are minimized.

When the depth to the base of the selected layer has been determined, the method proceeds to a decision block 30 to determine whether any more layers exist. If more layers exist, the method returns to block 18 where the next deeper layer is selected. Then the steps in blocks 20 through 28 are repeated. The process is complete when all boundaries have been derived for the three-dimensional velocity/depth model. The method then proceeds to block 32 where the entire three dimensional model is constructed. At this point, the new three dimensional model may be displayed, either on a cathode ray tube display or as a graphical display, such as commonly used in the art to illustrate a three dimensional representation of the earth's subsurface.

In the foregoing manner, a method for generating a three dimensional velocity model by using two dimensional depth images is illustrated. The out of plane distortion has been corrected by ray-tracing through an initial three dimensional model. The three dimensional model boundaries are iterated until the three dimensional effects are minimized. The final model can be use for a final three dimensional pre-stack depth migration, or as a three dimensional interpretation of all the two dimensional depth migration results.

While the present invention has been described by way of a preferred embodiment, it is to be understood that the present invention is not limited thereto but only by the scope of the following claims.

We claim:

1. A method for constructing a three dimensional velocity model from two dimensional data comprising the steps of:
   receiving two dimensional seismic data in the form of time migrated time sections;
   selecting a grid of seismic lines, each seismic line having a time migrated time section associated therewith;
   depth migrating said time migrated time sections associated with each line of said selected grid of seismic lines;
   selecting a reflector from said depth migrated seismic sections;
   constructing boundaries in three dimensions corresponding to said reflector;
   shooting rays from said selected reflector in two dimensions to obtain a first set of data points;
   shooting normal rays from said constructed boundaries in three dimensions to obtain a second set of data points;
   interpolating said first set of data points and said second set of data points to common x-y points;
   modifying said three dimensional boundaries to coincide with said common x-y points; and
   constructing a modified three dimensional velocity model.

2. The method according to claim 1 wherein said interpolating step includes the step of:
   deriving said common x-y points by a least squares method.

3. The method according to claim 1 also including the steps of:
   selecting a second reflector from said depth migrated seismic sections;

constructing boundaries in three dimensions corresponding to said second reflector;
shooting rays from said second selected reflector in two dimensions to obtain a third set of data points;
shooting normal rays from said constructed boundaries in three dimensions corresponding to said second reflector to obtain a fourth set of data points;
interpolating said third set of data points and said fourth set of data points to a second set of common x-y points;
modifying said three dimensional boundaries to coincide with said second set of common x-y points; and
constructing a modified multi-layer three dimensional velocity model.

4. The method according to claim 3 wherein said interpolating step includes the step of:
deriving said second set of common x-y points by a least squares method.

5. An apparatus for constructing a three dimensional velocity model from two dimensional data comprising:
receiver means for receiving two dimensional seismic data in the form of time migrated time sections;
grid selector means for selecting a grid of seismic lines, each seismic line having a time migrated time section associated therewith;
means for depth migrating said time migrated time sections associated with each line of said selected grid of seismic lines;
selector means for selecting a reflector from said depth migrated seismic sections;
means for constructing boundaries in three dimensions corresponding to said reflector;
two dimensional means for shooting rays from said selected reflector in two dimensions to obtain a first set of data points;
three dimensional means for shooting normal rays from said constructed boundaries in three dimensions to obtain a second set of data points;
means for interpolating said first set of data points and said second set of data points to common x-y points;
means for modifying said three dimensional boundaries to coincide with said common x-y points; and
means for displaying a modified three dimensional velocity model.

6. The apparatus according to claim 5 wherein said means for interpolating includes:
means for deriving said common x-y points by a least squares method.

7. A method for constructing a three dimensional velocity model from two dimensional data comprising the steps of:
receiving two dimensional seismic data in the form of time migrated time sections;
selecting a grid of seismic lines, each seismic line having a time migrated time section associated therewith;
depth migrating said time migrated time sections associated with each line of said selected grid of seismic lines;
selecting a reflector from said depth migrated seismic sections;
constructing boundaries in three dimensions corresponding to said reflector;
shooting rays from said selected reflector in two dimensions to obtain a first set of data points;
shooting normal rays from said constructed boundaries in three dimensions to obtain a second set of data points;
interpolating said first set of data points and said second set of data points to common x-y points by deriving said common x-y points by a least squares method.;
modifying said three dimensional boundaries corresponding to said reflector to coincide with said common x-y points;
selecting a second reflector from said depth migrated seismic sections;
constructing boundaries in three dimensions corresponding to said second reflector;
shooting rays from said second selected reflector in two dimensions to obtain a third set of data points;
shooting normal rays from said constructed boundaries in three dimensions corresponding to said second reflector to obtain a fourth set of data points;
interpolating said third set of data points and said fourth set of data points to a second set of common x-y points by deriving said second set of common x-y points by a least squares method;
modifying said three dimensional boundaries corresponding to said second reflector to coincide with said second set of common x-y points; and
constructing a modified multi-layer three dimensional velocity model.

8. A method for constructing a three dimensional velocity model from two dimensional data comprising the steps of:
receiving two dimensional seismic data in the form of time migrated time sections;
selecting a grid of seismic lines, each seismic line having a time migrated time section associated therewith;
depth migrating said time migrated time sections associated with each line of said selected grid of seismic lines;
selecting an event from said depth migrated seismic sections;
approximating a velocity model in three dimensions corresponding to said event;
shooting rays from said selected event in two dimensions to obtain a first set of data points and in three dimensions to obtain a second set of data points;
interpolating said first set of data points and said second set of data points to common x-y points;
modifying said three dimensional velocity model to coincide with said common x-y points; and constructing a modified three dimensional velocity model.

* * * * *